June 18, 1968   G. SCHAEFFLER   3,388,952
PLASTIC WINDOW CAGE FOR CYLINDRICAL ROLLER
Filed May 24, 1966
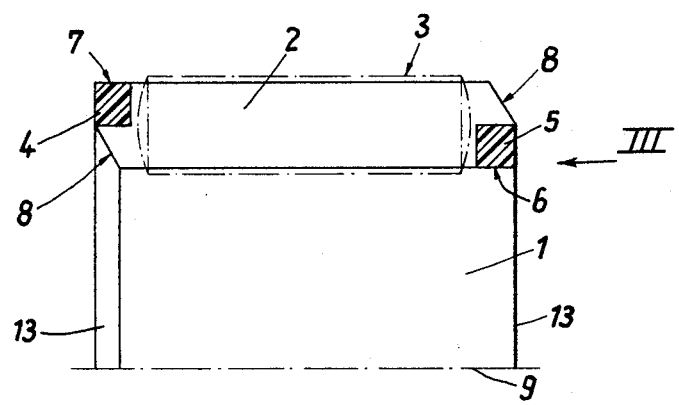
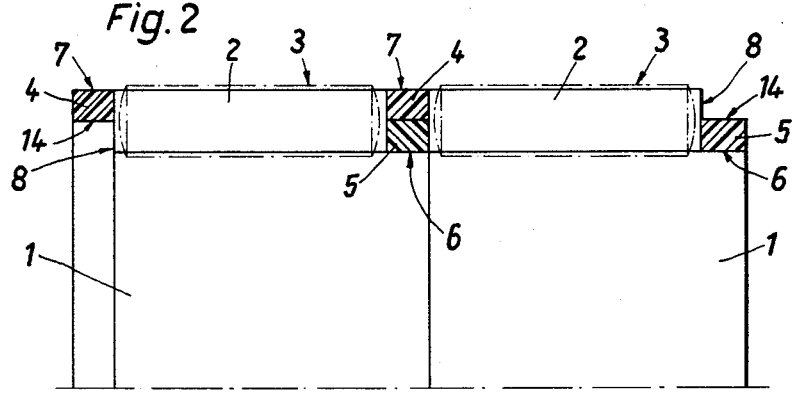
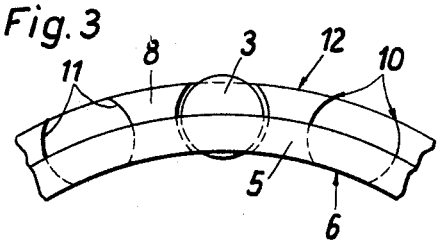
Inventor:
GEORG SCHAEFFLER
BY
*Hammond and Littell*
ATTORNEYS 3,388,952
PLASTIC WINDOW CAGE FOR
       CYLINDRICAL ROLLER
Georg Schaeffler, Herzogenaurach, Germany, assignor to
  Industriewerk Schaeffler OHG, Herzogenaurach, Germany, a corporation of Germany
        Filed May 24, 1966, Ser. No. 552,502
   Claims priority, application Germany, July 17, 1965,
                    J 14,029
               3 Claims. (Cl. 308—217)

ABSTRACT OF THE DISCLOSURE

Novel plastic window cages for cylindrical rollers having crossbars for accommodating the rollers, the said crossbars being connected to each other by two concentric rings having a radial extension about one-half the width of the crossbars, one ring extending from the inner diameter of the cage to about the center of the crossbar profile and the other ring extending from about the center of the crossbar profile to the outer diameter of the cage.

Prior art

Cages of this type have been known for some time and are particularly noted for their very simple manufacturing process, such as by injection molding. The injection molds for these cages consist simply of two parts axially slideable in opposite directions which molds are divided so that one part forms the radially external portion of the cage and the other part forms the radially internal portion of the cage. After the plastic has been injected into the mold cavity formed by the said two parts, the parts are separated in an axial direction. With molds divided in this way, the sides of the crossbars facing each other are adapted most perfectly to the shape of the rollers which effects perfect, axially-parallel guidance and support of the rollers. However, it was found that the front surfaces of the crossbars, disposed in the same plane with the front surfaces which axially retain the cage, have sharp edges, particularly at the corners formed by the junction of the lateral surfaces, the front surfaces and the peripheral surfaces of the crossbars. In bearing assemblies where these cages are directly adjacent to sealing elements, the danger exists that the relatively soft material of the sealing means is caught in these sharp corners and therefore the sealing elements are damaged. This danger is particularly great where slotted sealing means have to be used.

Objects of the invention

It is an object of the invention to provide a novel plastic window cage for cylindrical rollers which will not damage adjacent sealing means.

This and other objects and advantages of the invention will become obvious from the following detailed description.

The invention

The plastic window cage of the invention for cylindrical rollers is comprised of a plurality of crossbars which accommodate the rollers between them connected together at both ends with concentric rings having a radial extension about one-half the width of the crossbars, one ring extending from the inner diameter of the cage to about the center of the crossbar profile and the other ring extending from about the center of the crossbar profile to the outer diameter of the cage, the front surfaces of the crossbars being set back from the front surfaces axially defining the cage.

The setback of the front surfaces of the crossbars can be simply achieved by having the said front surfaces form an acute angle with the cage axis. This eliminates the sharp corners or edges at the indicated points or removes the corners or edges to points which are not in contact with bearing parts adjacent to the cage. This arrangement allows the cages to abut against sealing elements, which may even be slotted, without endangering or damaging the said elements.

When two or more cages of this type are parallelly arranged to attain a bearing of greater width, the front surfaces of the crossbars are advantageously set back by a distance about equal to the axial width of the concentric ring. The resulting offset lies within the cage on one side and outside the cage on the other, and this arrangement makes it possible to align any desired number of cages made with only one tool, without any additional cost. The cages thus constructed may be connected to each other by overlapping of the rims. For many uses, a loose sliding of one rim over the other rim will suffice as connecting means, but it is also possible to securely connect the cages to one another by glueing or similarly connecting the overlapping rims together. The connection can be achieved by securing projecting means in corresponding slots disposed on the concentric rings of the cage.

Referring now to the drawings:

FIG. 1 is a partial longitudinal sectional view through one embodiment of a bearing with one cage of the invention.

FIG. 2 is a partial longitudinal sectional view through another embodiment of a bearing with two cages of the invention.

FIG. 3 is a partial view of the cage of FIG. 1 in direction of arrow III.

In the embodiment of FIGS. 1 and 3, the window cage 1 is comprised of crossbars 2, which support and guide rollers 3 and the crossbars 2 are connected together at both ends by concentric rings 4 and 5 which are about half as wide as the crossbars in their radial extension. Concentric ring 5 extends from the inner diameter 6 of the cage to about the center of the crossbar profile while concentric ring 4 extends from about the center of the crossbar profile to the outer diameter 7 of the cage. The front surfaces 8 of the crossbars 2 form an acute angle with the cage axis 9. The sharp corners 10, resulting from the junction of the side surfaces 11, front surfaces 8 and the peripheral surfaces 12 of the crossbars 2, are set back from the front surfaces 13 on the axial ends of the cage so that the sharp corners do not come in contact with any parts, such as sealing elements, adjacent to the cage.

FIG. 2 illustrates an embodiment in which two cages are aligned next to each other to obtain a bearing of greater width. The front surfaces 8 of the crossbars 2 are moved back by a distance equal to the width of concentric rings 4 and 5. This provides on each concentric ring 4 and 5 a peripheral area 14 extending over the entire periphery and directed toward the center of the crossbar profile. Therefore, when the two cages are aligned in parallel, the concentric ring 4 of one cage overlaps the concentric ring 5 of the other cage to effect a connection of peripheral areas 14 over one another by glueing, welding, etc. The cross-section of the crossbars and development of the cage to guide and support the rollers can be changed .

Various modifications of the cage of the invention may be made without departing from the spirit or scope thereof and it is to be understood that the invention is to be limited only as defined in the appended claims.

What is claimed is:

1. A plastic window cage for cylindrical rollers comprising a plurality of crossbars which accommodate the rollers between them connected together at both ends with concentric rings having a radial extension about one-half the width of the crossbars, one ring extending from the inner diameter of the cage to about the center of the crossbar profile and the other ring extending from about the center of the crossbar profile to the outer diameter of the cage, the front surfaces of the crossbars being set back from the front surfaces axially defining the cage.

2. The window cage of claim 1 wherein the front surfaces of the crossbars form an acute angle with the axis of the cage.

3. The window cage of claim 1, wherein the front surfaces of the crossbars are set back from the front surfaces axially defining the cage by about a distance about equal to the axial width of the concentric rings.

References Cited

UNITED STATES PATENTS 1,188,632  6/1916  Dohner _____ 308—217

FOREIGN PATENTS 1,194,422  5/1959  France.

MARTIN P. SCHWADRON, *Primary Examiner.*

FRANK SUSKO, *Examiner.*